United States Patent
Hong et al.

(10) Patent No.: US 11,984,054 B2
(45) Date of Patent: May 14, 2024

(54) ELECTRONIC DEVICE HAVING FLEXIBLE DISPLAY

(71) Applicant: Samsung Electronics Co., Ltd., Gyeonggi-do (KR)

(72) Inventors: Eunseok Hong, Gyeonggi-do (KR); Seyoon Cheon, Gyeonggi-do (KR); Chulwoo Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/118,247

(22) Filed: Mar. 7, 2023

(65) Prior Publication Data

US 2023/0206800 A1 Jun. 29, 2023

Related U.S. Application Data

(63) Continuation of application No. PCT/KR2021/016263, filed on Nov. 9, 2021.

(30) Foreign Application Priority Data

Nov. 9, 2020 (KR) .......................... 10-2020-0148773

(51) Int. Cl.
*G09G 3/00* (2006.01)

(52) U.S. Cl.
CPC ......... *G09G 3/035* (2020.08); *G09G 2310/02* (2013.01); *G09G 2320/0626* (2013.01);
(Continued)

(58) Field of Classification Search
CPC .................. G09G 3/035; G09G 2310/02
(Continued)

(56) References Cited

U.S. PATENT DOCUMENTS

| | | | |
|---|---|---|---|
| 9,836,148 B2 | 12/2017 | Kim et al. | |
| 10,222,195 B2 | 3/2019 | Igari | |
| 10,359,900 B2 | 7/2019 | Hong et al. | |
| 10,712,862 B1* | 7/2020 | Kang | G06F 1/1643 |
| 11,252,826 B2* | 2/2022 | Park | H05K 1/028 |
| 2012/0314400 A1 | 12/2012 | Bohn et al. | |
| 2013/0127724 A1* | 5/2013 | Liu | H04M 1/0245 |
| | | | 345/168 |

(Continued)

FOREIGN PATENT DOCUMENTS

| | | |
|---|---|---|
| JP | 2009-253772 A | 10/2009 |
| KR | 10-2015-0060278 A | 6/2015 |

(Continued)

*Primary Examiner* — Calvin C Ma
(74) *Attorney, Agent, or Firm* — Cha & Reiter, LLC

(57) ABSTRACT

In an embodiment according to the present disclosure, disclosed is an electronic device including a display, a first housing, a second housing at least partially overlapping and being movable with respect to the first housing, a first conductive region formed or disposed inside the first housing, and a second conductive region formed or disposed inside the second housing so as to at least partially overlap with the first conductive region when the first housing is moved with respect to the first housing, a display in which at least the first region is exposed to the outside of an electronic device through a front surface of the electronic device, and at least one processor in which, when the electronic device is switched from the first state to the second state, a second region extending from the first region of the display is withdrawn from the inside of the first housing and exposed to the outside of the electronic device along with the first region and, when the electronic device is switched from the second state to the first state, is introduced into the inside of the first housing and operatively connected to the display. The at least one processor identifies a capacitance value, based on an overlapped region of the first conductive region and the second conductive region, and determines an externally exposed region of the display, based on the identified capacitance value, and controls the region determined to be exposed outside, to an activated state, and controls the remaining region except the region (Continued)

determined to be exposed outside, to an inactivated state. In addition to this, various embodiments identified through the specification are possible.

20 Claims, 11 Drawing Sheets

(52) U.S. Cl.
CPC ... *G09G 2320/08* (2013.01); *G09G 2340/045* (2013.01); *G09G 2340/0464* (2013.01); *G09G 2356/00* (2013.01)

(58) Field of Classification Search
USPC ......................................................... 345/694
See application file for complete search history.

(56) References Cited

U.S. PATENT DOCUMENTS

| | | |
|---|---|---|
| 2013/0201208 A1 | 8/2013 | Cho et al. |
| 2015/0116920 A1* | 4/2015 | Franklin ................. G06F 1/163 |
| | | 361/679.26 |

FOREIGN PATENT DOCUMENTS

| | | |
|---|---|---|
| KR | 10-2016-0087460 A | 7/2016 |
| KR | 10-1659281 B1 | 9/2016 |
| KR | 10-2017-0014886 A | 2/2017 |
| KR | 10-2017-0069022 A | 6/2017 |
| KR | 10-2018-0043433 A | 4/2018 |
| KR | 10-2019-0101184 A | 8/2019 |

* cited by examiner

ELECTRONIC DEVICE HAVING FLEXIBLE DISPLAY

CROSS-REFERENCE TO RELATED APPLICATION(S)

This application is a continuation of International Application No. PCT/KR2021/016263, filed on Nov. 9, 2021, which claims priority to Korean Patent Application No. 10-20 20-0148773 filed on Nov. 9, 2020 in the Korean Intellectual Property Office, the disclosures of which are herein incorporated by reference.

TECHNICAL FIELD

Various embodiments of the present disclosure relate to a technology for recognizing an extension extent of a flexible display in an electronic device having the flexible display.

BACKGROUND

Electronic devices have a variety of functions, such as taking photos or moving pictures, playing music files or moving pictures, games, the receiving of broadcasting, supporting wireless Internet, etc., and are implemented in the form of comprehensive multimedia players. Accordingly, the electronic devices are developing into new forms in terms of hardware or software in order to satisfy user's needs while enhancing portability and convenience.

In order for the electronic device to be portable, the electronic device should be small in size, and generally capable of being carried in a pocket. However, the size of the electronic device restricts the size of the screen. A smaller screen results in a less pleasing user experience. Accordingly, an electronic device can be implemented as a flexible type. This allows the electronic device to have smaller dimensions when being carried by the user, but increased in size during usage.

In a flexible type electronic device, a mechanical state can be changed by a user gesture or handling. Also, the flexible type electronic device can control the operation of the electronic device, based on a state change. For example, the flexible type electronic device can change from a state in which a portion of a display is rolled in to the inside of the electronic device to a state in which it is rolled out.

During times where the portion of the display is rolled in, the portion of the display is not visible. Therefore, displaying content on the portion of the display that is rolled in would waste power. However, when the portion of the display is rolled out, content should be displayed on the portion of the display.
Accordingly, a technology for determining a region of the display which is exposed outside and activating only the region determined to be exposed outside is beneficial.

SUMMARY

A technological solution the present document seeks to achieve is not limited to the above-mentioned technological solution, and other technological solutions not mentioned above would be able to be clearly understood by a person having ordinary skill in the art from the following statement.

An electronic device of an embodiment can include a first housing, a second housing at least partially overlapping with the first housing and being movable, a first conductive region formed or disposed inside the first housing, a second conductive region formed or disposed inside the second housing to at least partially overlap with the first conductive region when the second housing moves with respect to the first housing, a display in which at least a first region is exposed to the outside of the electronic device through a front surface of the electronic device, and a second region extending from the first region of the display is withdrawn from the inside of the first housing and exposed to the outside of the electronic device together with the first region when the electronic device is switched from a first state to a second state, and is introduced into the inside of the first housing when the electronic device is switched from the second state to the first state, and at least one processor operatively connected to the display. The at least one processor can identify a capacitance value, based on an overlapped region of the first conductive region and the second conductive region, determine an externally exposed region among the display, on the basis of the identified capacitance value, and control the region determined to be exposed outside, to an activated state, and control the remaining region except the region determined to be exposed outside, to an inactivated state.

A method of operating an electronic device having a flexible display of an embodiment can include identifying, by a processor of the electronic device, a capacitance value, based on an overlapping region of a first conductive region formed or disposed inside a first housing of the electronic device and a second conductive region formed or disposed inside a second housing of the electronic device, determining, by the processor, an externally exposed region among the flexible display, based on the identified capacitance value, and controlling, by the processor, the region determined to be exposed outside, to an activated state, and controlling the remaining region except the region determined to be exposed outside, to an inactivated state.

By activating only a region of a display exposed outside, an electronic device of various embodiments of the present disclosure can reduce the consumption of an electric current and simultaneously present various effects to a UI.

In addition, various effects directly or indirectly identified through the present document can be presented.

BRIEF DESCRIPTION OF DRAWINGS

With regard to the description of the drawings, the same or similar reference numerals can be used for the same or similar components.

DETAILED DESCRIPTION

Hereinafter, various embodiments of the present document will be described with reference to the accompanying drawings. However, this is not intended to limit the specific embodiments of the present document, and it should be understood that various modifications, equivalents, and/or alternatives of the embodiments of the present document are included.

Figure 1A:
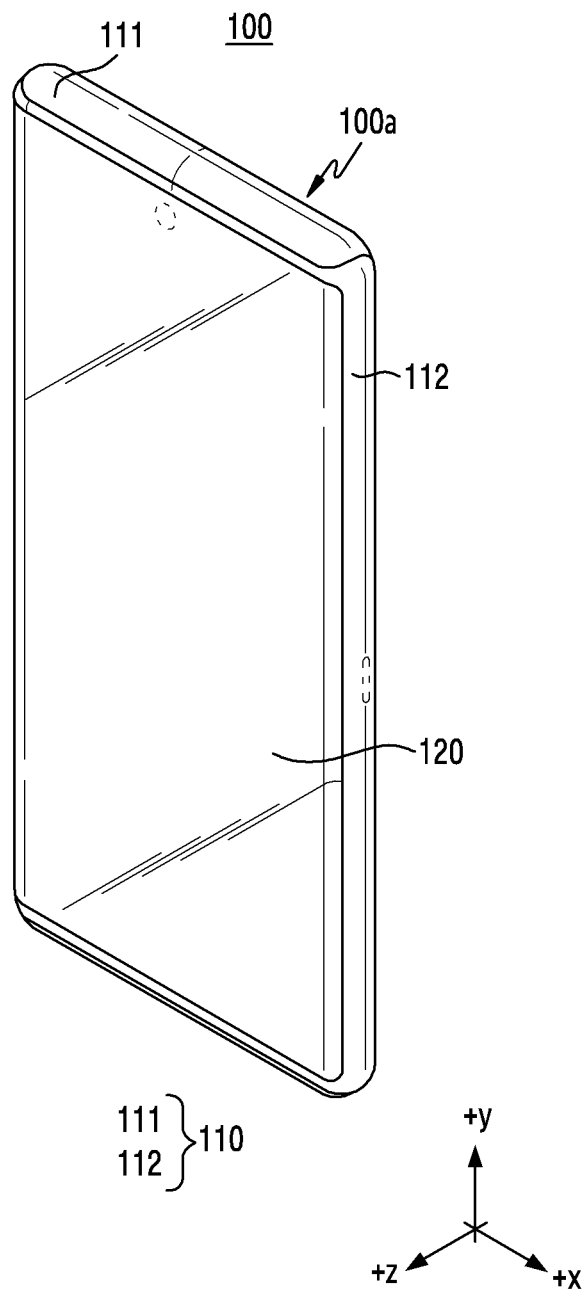
FIG. 1A is a front perspective view of a first state (e.g., a reduced state) of an electronic device according to an embodiment.
Figure 1B:
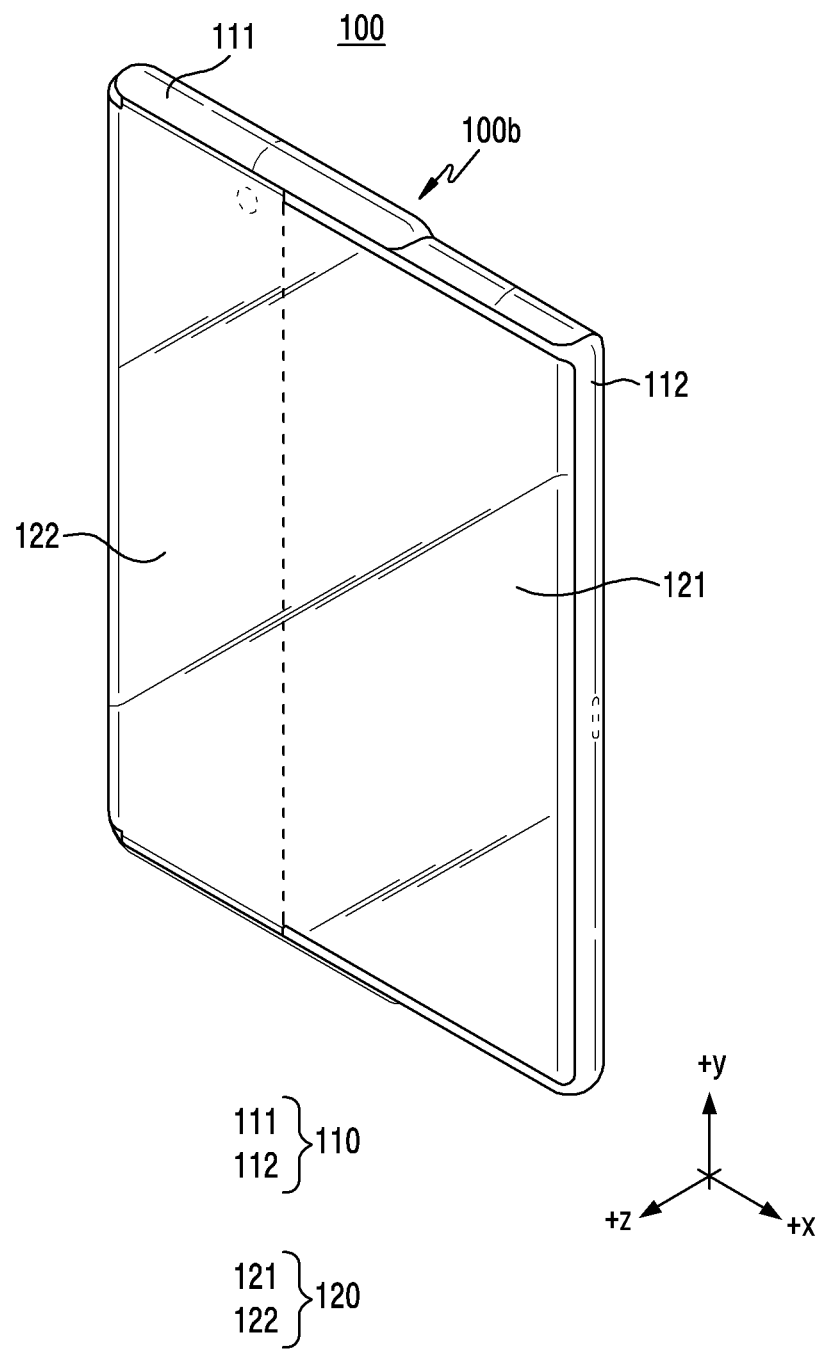
FIG. 1B is a front perspective view of a second state (e.g., an extended state) of an electronic device according to an embodiment.

FIG. 1A is a front perspective view of a first state (e.g., a reduced state) of an electronic device 100 according to an embodiment. FIG. 1B is a front perspective view of a second state (e.g., an extended state) of the electronic device 100 according to an embodiment.

According to various embodiments disclosed in the present document, a surface directed in the substantially same direction as a direction in which at least a portion (e.g., a first part 121) of the flexible display 120 located outside the electronic device 100 is directed can be defined as a front surface of the electronic device 100, and a surface facing the front surface can be defined as a rear surface of the electronic device 100. A surface surrounding the space between the front surface and the rear surface can be defined as a side surface of the electronic device 100.

The flexible display 120 can be disposed on at least a portion of the electronic device 100 of an embodiment. According to an embodiment, the flexible display 120 can be disposed to include at least a partial flat shape and at least a partial curved shape. According to an embodiment, the flexible display 120, and a housing 110 surrounding at least some of edges of the flexible display 120, can be disposed on the front surface of the electronic device 100.

Figure 2:
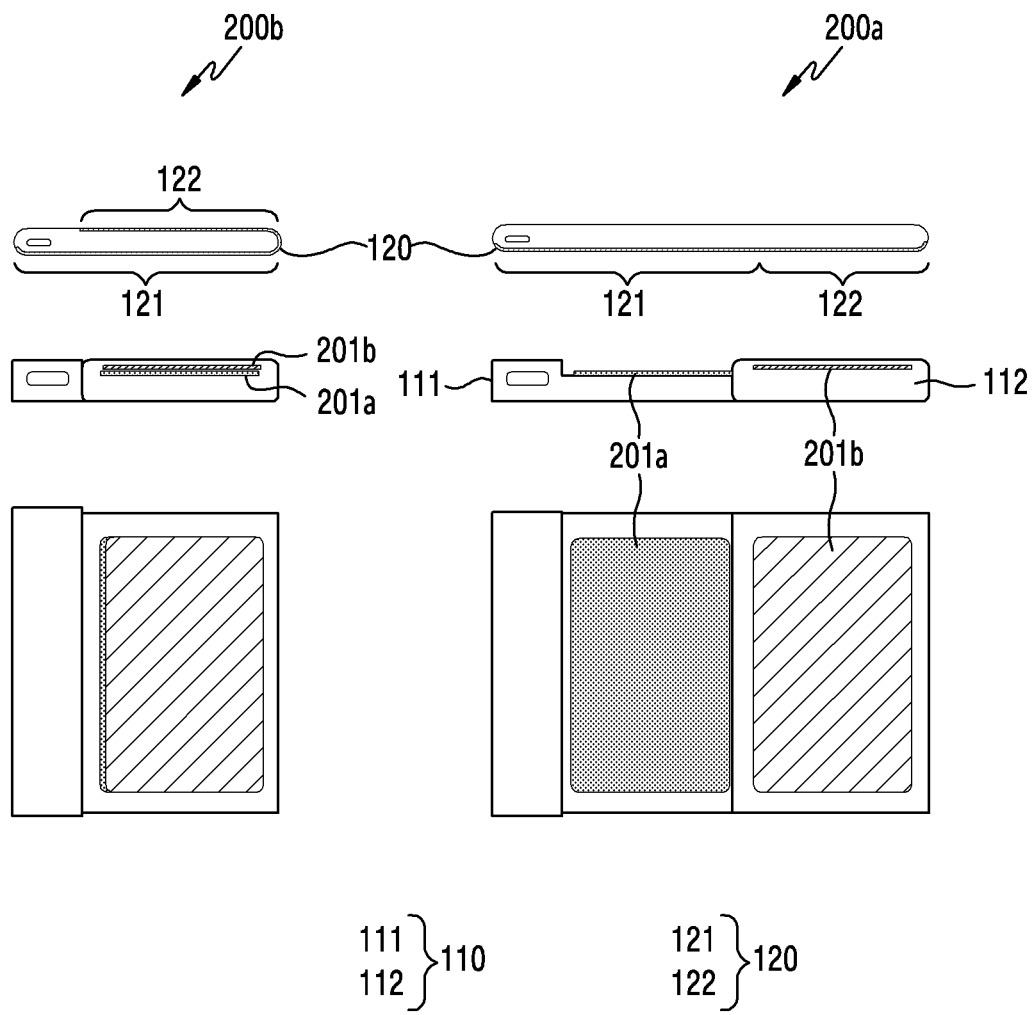
FIG. 2 illustrates an overlapping extent of conductive regions dependent on a state change of an electronic device according to an embodiment.

According to an embodiment, the housing 110 can form a partial region of the front surface (e.g., a surface of the electronic device 100 directing in a +z direction in FIGS. 1 and 2) of the electronic device 100, the rear surface (e.g., a surface of the electronic device 100 directing in a −z direction in FIGS. 1 and 2), and the side surface (e.g., a surface connecting between the front and rear surfaces of the electronic device 100). According to another embodiment, the housing 110 can form a partial region of the side surface of the electronic device 100, and the rear surface.

According to an embodiment, the housing 110 can include a first housing 111, and a second housing 112 movably coupled to the first housing 111 in a predetermined range.

According to an embodiment, the flexible display 120 can include the first part 121 that can be coupled to the second housing 112, and a second part 122 which can extend from the first part 121 and insert into the electronic device 100.

According to an embodiment, the electronic device 100 can include a first state 100a and a second state 100b. For example, the first state 100a and the second state 100b of the electronic device 100 can be determined according to a relative position of the second housing 112 with respect to the first housing 111, and the electronic device 100 can be constructed to be changeable between the first state 100a and the second state 100b by a user's control or a mechanical operation.

According to an embodiment, the first state 100a of the electronic device 100 can mean a state before the housing 110 is extended. The second state 100b of the electronic device 100 can mean a state in which the housing 110 is extended.

According to an embodiment, when the electronic device 100 is switched from the first state 100a to the second state 100b according to the movement of the second housing 112, the second part 122 of the flexible display 120 can be withdrawn (or exposed) from the inside of the electronic device 100 to the outside. As used in this document, that the flexible display 120 is "withdrawn (or exposed)" shall mean that at least a portion of the second part 122 of the flexible display 120 is viewable from the outside of the electronic device 100. In another embodiment, when the electronic device 100 is switched from the second state 100b to the first state 100a according to the movement of the second housing 112, the second part 122 of the flexible display 120 can be introduced into the electronic device 100. As used in this document, "introduced" shall mean that the at least a portion of the second part 122 of the flexible display 120 is not viewable or exposed from the outside of the electronic device 100.

Figure 3:
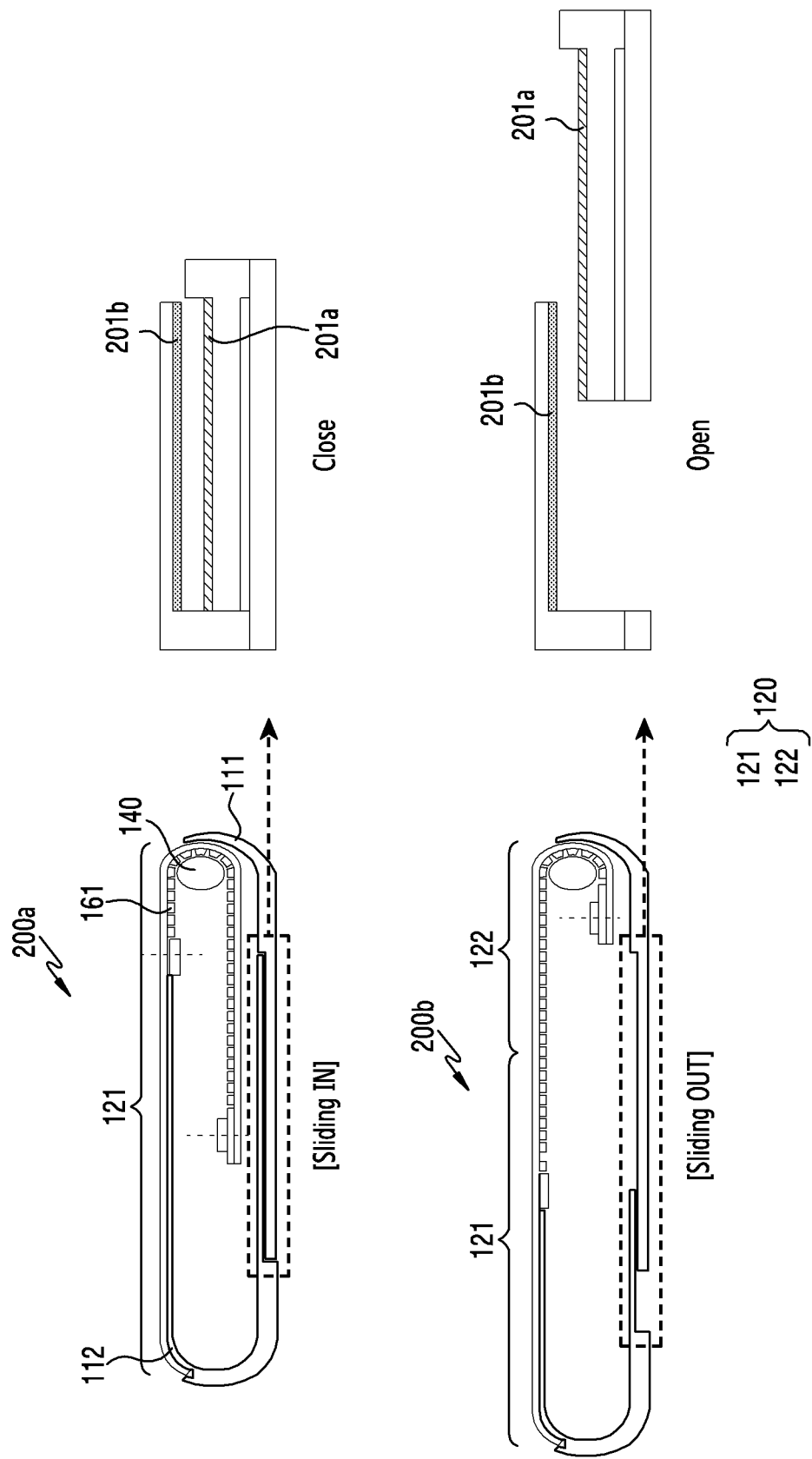
FIG. 3 is a side cross-sectional view illustrating an overlapping extent of conductive regions according to a state change of an electronic device according to an embodiment.

FIG. 2 illustrates an overlapping extent of conductive regions dependent on a state change of an electronic device according to an embodiment. FIG. 3 is a side cross-sectional view illustrating the overlapping extent of the conductive regions dependent on the state change of the electronic device according to an embodiment. The content described above with respect to FIGS. 2 and 3 can be simplified or omitted.

Referring to FIG. 2 and FIG. 3, according to an embodiment, the first state 200a (e.g., a reduced state) can be referred to as a first shape, and the second state 200b (e.g., an extended state) can be referred to as a second shape. For example, the first shape can be referred to as a "normal" state, a "reduced" state, a "closed" state, or a "slide-in" state, and the second shape can refer to as an "extended" state, an "open" state, or a "slide-out" state. Also, in an embodiment, the electronic device 100 can form a third state between the first state 100a and the second state 100b. The third state can be referred to as a third shape, and the third shape can include a free stop state.

Referring to FIG. 2 and FIG. 3, the electronic device 100 of an embodiment can include the display 120, the first housing 111, the second housing 112, a roller 140, a rolling rail 161, a first conductive region 201a, and a second conductive region 201b. According to an embodiment, the housing 110 of the electronic device 100 can be formed of a metal material. For example, the first housing 111 and the second housing 112 can be formed of a bracket material.

According to an embodiment, the rolling rail 161 can include a plurality of joint structures and support plates. According to an embodiment, a shape of some regions of the plurality of joint structures can be deformed while the state of the electronic device 100 is switched. For example, some regions of the plurality of joint structures can be bent or unfolded to have a specified curvature in a process in which the electronic device 100 is switched from the first state 200a to the second state 200b or is switched from the second state 200b to the first state 200a. According to another embodiment, the second housing 112 can be fixed or coupled to one end of the plurality of joint structures, and a portion of a first part 121 (e.g., the first part 121 of FIG. 1B) of the display 120 can be disposed at an upper end of the second housing 112. In another example, a support plate can be fixed or coupled to one end of the plurality of joint structures. According to an embodiment, the rolling rail 161 can include a form in which a plurality of bars extending in a direction (e.g., a +y direction of FIG. 1A and FIG. 1B) of an axis of rotation of the roller 140 are arranged. The rolling rail 161, for example, can have flexibility due to portions having relatively thin thicknesses between the plurality of bars. According to some embodiments, the rolling rail 161 can be referred to as a 'display support structure' as an element supporting the flexible display 120 as well. In various embodiments, the rolling rail 161 can be referred to various other terms such as a 'flexible track' as well.

According to an embodiment, the roller 140 can come into contact with the plurality of joint structures of the rolling rail 161, and the rolling rail 161 can move within a specified range by the rotation of the roller 140. For example, when the roller 140 rotates counterclockwise while the electronic device 100 is switched from the first state 200a to the second state 200b, as some regions of the plurality of bent joint structures are unfolded, the rolling rail 161 can move in a first direction (e.g., a direction of getting far away from the roller 140). For another example, when the roller 140 rotates clockwise while the electronic device 100 is switched from the second state 200b to the first state 200a, as some regions of the plurality of unfolded joint structures are bent, the rolling rail 161 can move in a second direction (e.g., in a direction opposite to the first direction). According to an embodiment, as the shape of some regions of the plurality of joint structures is deformed in a process of switching a state of the electronic device 100, even a shape of the second part 122 (e.g., the second part 122 of FIG. 1B) of the display 120 supported by the plurality of joint structures can be deformed to correspond to the shape of the plurality of joint structures.

According to an embodiment, the first conductive region 201a can be formed or disposed inside the first housing 111. For example, the first housing 111 can be formed of a bracket material, and the first conductive region 201a can be disposed on a surface of the first housing 111. According to an embodiment, the second conductive region 201b can be formed or disposed inside the second housing 112. For example, the second housing 112 can be formed of a bracket material, and the second conductive region 201b can be disposed on at least a portion of a surface of the second housing 112.

According to an embodiment, the shapes and sizes of the first conductive region 201a and the second conductive region 201b can be varied and are not limited to the shapes depicted in the drawings. For example, an area size of at least one of the first conductive region 201a and the second conductive region 201b can be about 3 cm×3 cm or more. Also, for example, at least one of the first conductive region 201a and the second conductive region 201b can have a non-square shape rather than a square shape. For example, the area size of at least one of the first conductive region 201a and the second conductive region 201b can be about 8 mm×15 mm or more. According to an embodiment, at least one of the first conductive region 201a and the second conductive region 201b can be formed of a copper (Cu) material. According to an embodiment, the first conductive region 201a or the second conductive region 201b can be electrically connected to the ground (GND).

According to an embodiment, in the first state 200a (e.g., a reduced state) of the electronic device 100, the first conductive region 201a and the second conductive region 201b can overlap as much as a first region. According to an embodiment, as the electronic device 100 is switched from the first state 200a to the second state 200b, a size of the overlapped region (e.g., the first region) of the first conductive region 201a and the second conductive region 201b can be decreased. For example, as the second housing 112 moves away from the first housing 111, the size of the overlapped region of the first conductive region 201a and the second conductive region 201b can decrease. In the second state 200b (e.g., an extended state) of the electronic device 100 of an embodiment, the first conductive region 201a and the second conductive region 201b can overlap as much as a second region having a smaller size than the first region.

According to an embodiment (not shown), at least one of the first conductive region 201a and the second conductive region 201b can consist of a plurality of regions. For example, the first conductive region 201a can include a 1-1 conductive region and a 1-2 conductive region, and the 1-1 conductive region can be located in a +x or +y direction, and the 1-2 conductive region can be located in a −x or −y direction. However, the present invention is not limited to this, and the first conductive region 201a and/or the second conductive region 201b can consist of a plurality of regions, and can be disposed inside the electronic device 100.

Figure 4:
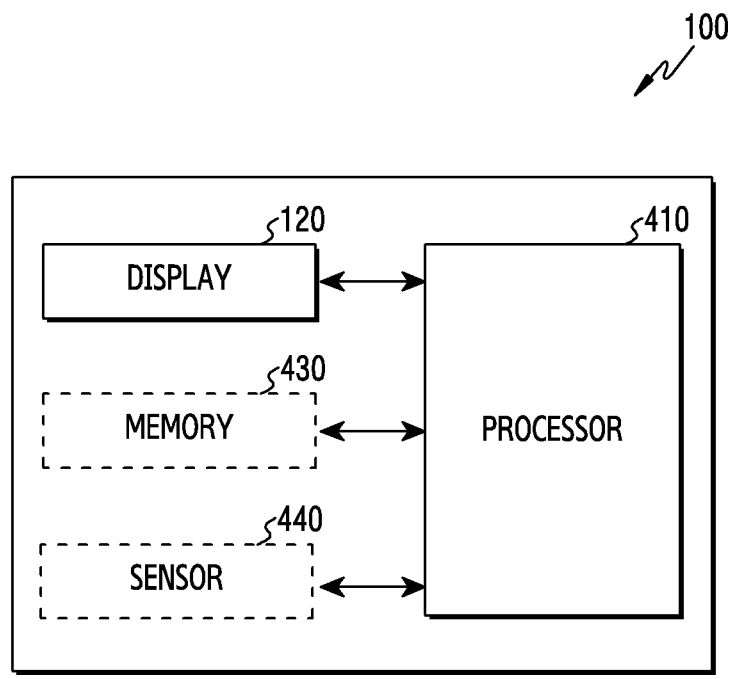
FIG. 4 is a block diagram of an electronic device according to an embodiment.

FIG. 4 is a block diagram of an electronic device according to an embodiment.

Referring to FIG. 4, the electronic device 100 can include a processor 410, the display 120, a memory 430, and a sensor 440. In various embodiments, the electronic device 100 can include additional components in addition to the components illustrated in FIG. 4, or can omit at least one of the components illustrated in FIG. 4.

According to an embodiment, the processor 410 can execute operation or data processing which is related to control and/or communication of at least one another component of the electronic device 100, by using instructions stored in the memory 430. According to an embodiment, the processor 410 can include at least one of a central processing unit (CPU), a graphics processing unit (GPU), a micro controller unit (MCU), a sensor hub, a supplementary processor, a communication processor, an application processor, an application specific integrated circuit (ASIC) and/or field programmable gate arrays (FPGA), and can have a plurality of cores.

According to an embodiment, the processor 410 can identify a capacitance value, based on the overlapped region of the first conductive region 201a and the second conductive region 201b. According to an embodiment, the processor 410 can determine an externally exposed region of the display, based on the identified capacitance value. The detailed content related to the operation of the processor 410 will be described later with reference to FIG. 5.

According to an embodiment, the display 120 can display various contents (e.g., a text, an image, a video, an icon, and/or a symbol, etc.). According to an embodiment, the display 120 can include a liquid crystal display (LCD), a light emitting diode (LED) display, an organic light emitting diode (OLED), or a micro light emitting diode (LED) display. According to an embodiment, the display 120 can control the region determined to be exposed outside, to an activated state, according to a command of the processor 410. According to an embodiment, the display 120 can control the remaining region except the region determined to be exposed outside among regions of the display, to an inactivated state, according to a command of the processor 410. According to an embodiment, the display 530 can include a touch circuitry configured to sense a touch, or a sensor circuitry (e.g., a pressure sensor) configured to measure an intensity of a force provided by the touch.

According to an embodiment, the display 120 can include a plurality of display processors (e.g., a DDI and a display driver IC). For example, the electronic device 100 can include a display processor for performing independent control by each part (e.g., the first part 121 and/or the second part 122 of FIG. 8) of the display visually exposed outside. For example, the electronic device 100 can include a first display processor for controlling the first part 121, and a second display processor for controlling the second part 122. Also, independent signal processing (e.g., a gate driver and/or a source drive) can be performed by each display processor.

According to an embodiment, the memory 430 can store various data which are acquired or used by at least one component (e.g., a processor) of the electronic device 100. For example, the memory 430 can store information about a state (e.g., the first state or the second state) of the electronic device 100 acquired by the processor 410.

According to an embodiment, the sensor 440 can obtain an extended state of the electronic device 100, and output a signal corresponding to the obtained state. According to an embodiment, the sensor 440 can obtain or detect a movement of the second housing 112 with respect to the first housing 111. According to an embodiment, the sensor 440 can include at least one of a touch sensor, a time of flight (ToF) sensor, a proximity sensor, an inertial sensor, and a hall sensor. According to an embodiment, the sensor 440 can include at least one of an acceleration sensor, a gyro sensor, and a geomagnetic sensor, or can check a state of the electronic device 100 with respect to the ground surface by using sensing data obtained from at least one of them. For example, the sensor 440 can detect a direction in which the electronic device 100 is directed, in an inclined angle of the electronic device 100 and/or a three-dimensional coordinate system. However, the present invention is not limited to this, and various sensors 440 capable of obtaining information about the state of the electronic device 100 can be used. For example, the acceleration sensor can obtain information about a linear motion of the electronic device 100 and/or an acceleration of the electronic device 100 related to three axes. Also, for example, the gyro sensor can obtain information related to the rotation of the electronic device 100, and the geomagnetic sensor can sense information about a direction in which the electronic device 100 is directed in an absolute coordinate system.

Figure 5:
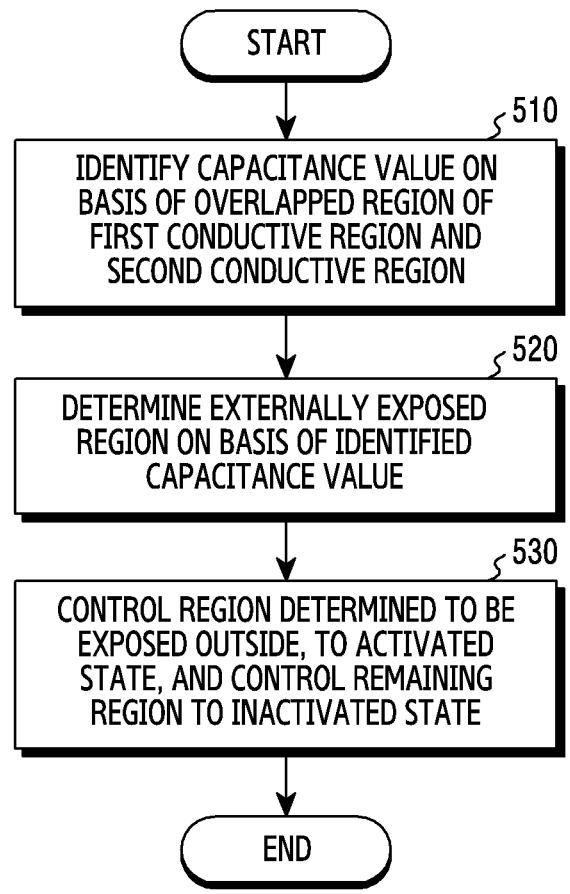
FIG. 5 is a flowchart illustrating an operation of determining the extension of a display on the basis of an overlapped region of a conductive region in an electronic device according to an embodiment.

FIG. 5 is a flowchart illustrating an operation of determining the extension of a display, based on an overlapped region of conductive regions, in an electronic device according to an embodiment.

Referring to FIG. 5, in operation 510, a processor (e.g., the processor 410 of FIG. 4) of an embodiment can identify a capacitance value, based on an overlapped region of the first conductive region 201a and the second conductive region 201b.

According to an embodiment, as the overlapped region of the first conductive region 201a and the second conductive region 201b increases, the processor 410 can identify (or confirm) the capacitance value as a larger value. For example, when the electronic device 100 is in the first state 200a and the first conductive region 201a and the second conductive region 201b overlap as much as a first region, the processor 410 can identify a first capacitance value, based on a size of the first region. For example, when the size of the overlapped region of the first conductive region 201a and the second conductive region 201b decreases as the electronic device 100 is switched from the first state 200a to the second state 200b, the processor 410 can identify a capacitance value smaller than the first capacitance value. According to an embodiment, when the electronic device 100 is in the second state 200b and the first conductive region 201a and the second conductive region 201b overlap as much as a second region, the processor 410 can identify a second capacitance value smaller than the first capacitance value, based on a size of the second region.

According to an embodiment, the processor 410 can determine an externally exposed region of the display, based on the capacitance value identified in operation 520. According to an embodiment, the processor 410 can control an analog to digital converter (ADC) to convert the identified capacitance into a digital signal and output data about the corresponding capacitance value. According to another embodiment, the processor 410 can control a capacitance to digital converter (CDC) to output data about the capacitance value.

According to an embodiment, the processor 410 can control a voltage source to measure a capacitance value. According to an embodiment, the capacitance can be formed within a predetermined range (e.g., 0 pF to about 10 pF) according to the extent to which the first conductive region 201a and the second conductive region 201b overlap. For example, when the first conductive region 201a and the second conductive region 201b do not overlap, a first capacitance (e.g., 0 pF) can be formed and, when the first conductive region 201a and the second conductive region 201b overlap as much as the maximum region, a second capacitance (e.g., about 10 pF) can be identified. According to the aforementioned embodiment, by measuring a capacitance by means of the voltage source, the electronic device 100 can improve a precision.

According to an embodiment, the processor 410 can determine an externally exposed region of the display, based on information on a variation amount of the capacitance value.

According to an embodiment, the processor 410 can control the region determined to be exposed outside in operation 530, to an activated state, and control the remaining regions to an inactivated state. According to an embodiment, the processor 410 can display a user interface (UI) on a display region that is in the activated state. For example, as a state of the electronic device 100 changes, the processor 410 can change a location of the UI to the center, based on the region determined to be exposed outside. Also, for example, the processor 410 can change a size of an execution screen on which contents are displayed, at a specified rate, based on the size of the region determined to be exposed outside.

The processor (e.g., the processor 410 of FIG. 4) of another embodiment can, in operation 510, identify a resistance value, based on an overlapped region of the first conductive region 201a and the second conductive region 201b, and can, in operation 520, determine an externally exposed region of the display, based on the resistance value, and can, in operation 530, control the region determined to be exposed outside to an activated state and control the remaining regions to an inactivated state.

When performing operation 520, the processor (e.g., the processor 410 of FIG. 4) of another embodiment can make determination, based on different information. For example, one of a plurality of regions constituting the first conductive region 201a and/or the second conductive region 201b can be determined based on a variation amount of a capacitance value, and another region can be determined based on a variation amount of a resistance value.

According to the above-described embodiment, in the present disclosure, the electronic device can reduce current consumption, by controlling only a region of the display visually viewed from the outside, to the activated state.

Figure 6:
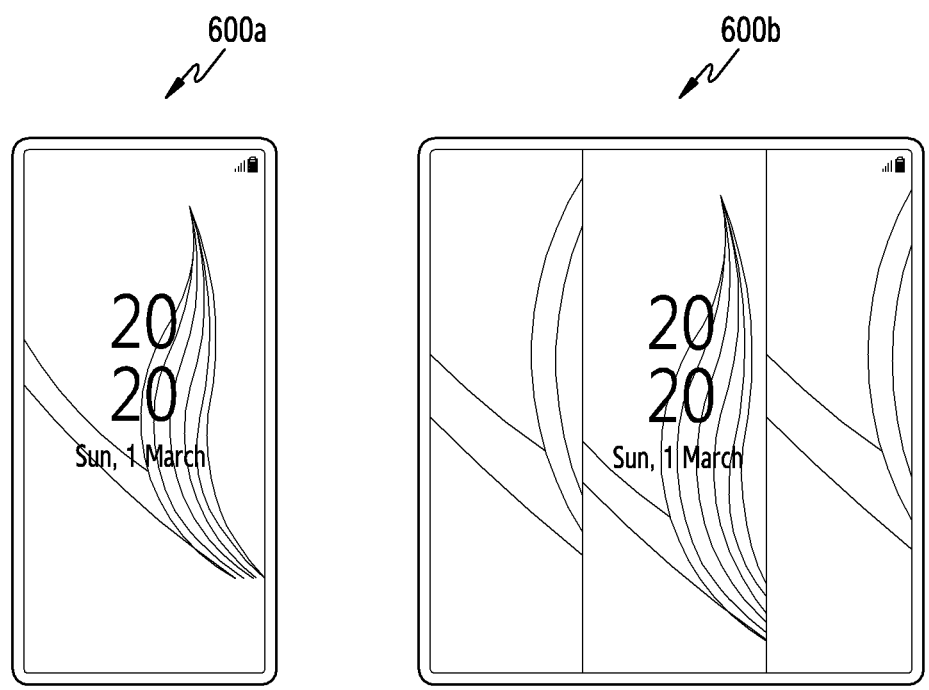
FIG. 6 is a diagram illustrating the content of changing a location of a UI according to the extension of a display in an electronic device according to an embodiment.

FIG. 6 is a diagram illustrating the content of changing a location of a UI according to the extension of a display in an electronic device according to an embodiment.

Referring to FIG. 6, according to an embodiment, the processor 410 can identify a capacitance value, based on as much overlapping of the first conductive region 201a and the second conductive region 201b as a first region in a first state 600a (e.g., a reduced state). According to an embodiment, the processor 410 can determine a region of the display exposed outside, based on the capacitance value identified in the first state 600a. According to an embodiment, the processor 410 can activate a display region determined to be exposed outside, and output at least one content to the activated display region. According to an embodiment, the processor 410 can output static contents to the display 120. For example, a static execution screen can refer to contents whose screen is not changed within a specified threshold time, such as a home screen or an image, or a region to be changed is less than a specified rate. According to another embodiment, the processor 410 can display dynamic contents on the display 120. For example, the dynamic contents can mean contents whose screen moves within a specified threshold time, such as game contents or a video.

According to an embodiment, the processor 410 can change a location of contents in a second state 600b (e.g., an extended state). For example, the processor 410 can change a location of the contents to the center, based on a region which is exposed outside while the electronic device 100 is extended. For another example, in response to the completion of the extension of the electronic device 100, the processor 410 can change a location of the contents to the center of a display externally exposed.

Figure 7:
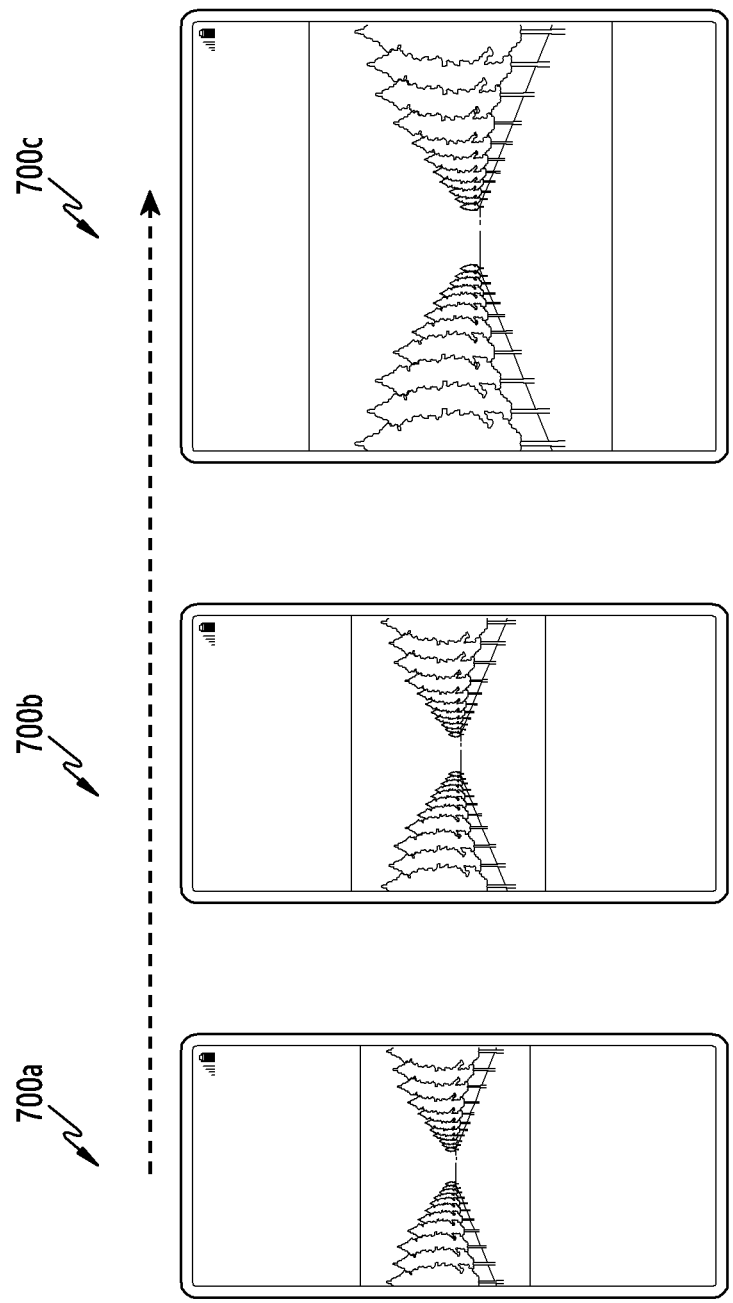
FIG. 7 is a diagram illustrating the content of changing a size of a UI at a specified rate according to the extension of a display in an electronic device according to an embodiment.

FIG. 7 is a diagram illustrating the content of changing a size of a UI at a specified rate according to the extension of a display in an electronic device according to an embodiment. Content similar to or corresponding to content described above with respect to FIG. 7 can be simplified or omitted.

Referring to FIG. 7, according to an embodiment, the processor 410 can activate a display region determined to be exposed outside, based on that the first conductive region 201a and the second conductive region 201b overlap as much as a first region in a first state 700a (e.g., a reduced state), and can output at least one content to the activated display region. According to an embodiment, the processor 410 can output an execution screen of contents at a first size, based on a size of the display region determined to be externally exposed in the first state 700a.

According to an embodiment, the processor 410 can obtain a variation amount of capacitance dependent on a size change of a region where conductive regions overlap as the electronic device 100 is switched from the first state 700a to a second state 700b. According to an embodiment, the processor 410 can determine an externally exposed region among a display region, based on an overlapped region of the first conductive region 201a and the second conductive region 210b in the second state 700b. According to an embodiment, as a physical state of the electronic device 100 is switched, the processor 410 can control an extended region of a display to an activated state.

According to an embodiment, the processor 410 can change a size of an execution screen on which contents are executed at a specified rate, based on the size of the region determined to be exposed outside. For example, the processor 410 can output the execution screen of the contents at a second size, based on the size of the display region determined to be externally exposed in the second state 700b.

According to an embodiment, the processor 410 can detect a change in the amount of capacitance because the area of overlap between conductive regions changes when the electronic device 100 is switched from the second state 700b to a third state 700c. According to an embodiment, the processor 410 can determine an externally exposed region among a display region, based on an overlapped region of the first conductive region 201a and the second conductive region 210b in the third state 700c. According to an embodiment, the processor 410 can control the region determined to be exposed outside among the display region to the activated state.

According to an embodiment, the processor 410 can change, at a specified rate, a size of an execution screen whose contents are executed, based on the size of the region determined to be exposed outside. For example, the processor 410 can output the execution screen of the contents at a third size, based on the size of the display region determined to be externally exposed in the third state 700c.

Figure 8:
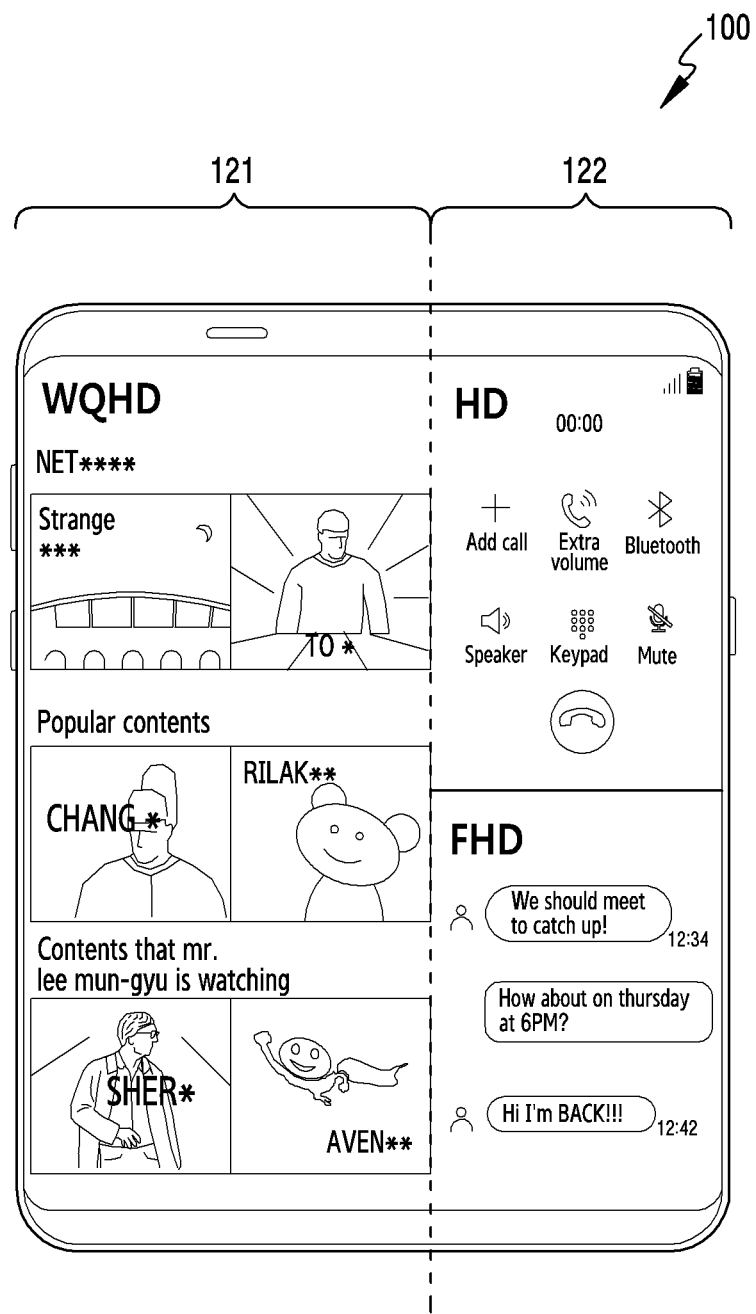
FIG. 8 is a diagram illustrating that a multi-window is displayed on a display in an electronic device according to an embodiment.

FIG. 8 is a diagram illustrating that a multi-window is displayed on a display in an electronic device according to an embodiment.

Referring to FIG. 8, the processor 410 of an embodiment can control an externally exposed display to an activated state, based on an overlapped region of the first conductive region 201a and the second conductive region 201b. According to an embodiment, when the electronic device 100 is in a second state (e.g., an extended state), the processor 410 can control the first part 121 and the second part 122 to the activated state.

According to an embodiment, the processor 410 can display an execution screen of at least one application on the display 120 determined to be externally exposed. According to an embodiment, an execution screen of a plurality of applications can be displayed in a plurality of regions within a display screen, together. For example, an execution screen of a first application can be displayed on the first part 121 of the display 120, and an execution screen of a second application and an execution screen of a third application can be displayed on the second part 122.

According to an embodiment, the processor 410 can determine an executed application or contents to display, based on a size of the display 120 visually exposed outside. For example, the processor 410 can determine the size of the externally visually exposed display 120, based on information (e.g., a capacitance value or a resistance value) determined using a first conductive region (e.g., the first conductive region 201a of FIG. 2 or FIG. 3) and a second conductive region (e.g., the second conductive region 201b of FIG. 2 or FIG. 3), and can determine an executed application or contents in the first part 121 and/or the second part 122, based on the determined size of the display 120. For example, in a second state (e.g., the second state 700b of FIG. 7), the electronic device 100 can display an execution screen of a first application on the first part 121 of the display 120, and can display at least one content included in the first application on the second part 122. For another example, in a third state (e.g., the third state 700b of FIG. 7), the electronic device 100 can display the execution screen of the first application on the first part 121 of the display 120, and can display a second application and at least one content included in the second application on the second part 122.

Figure 9:
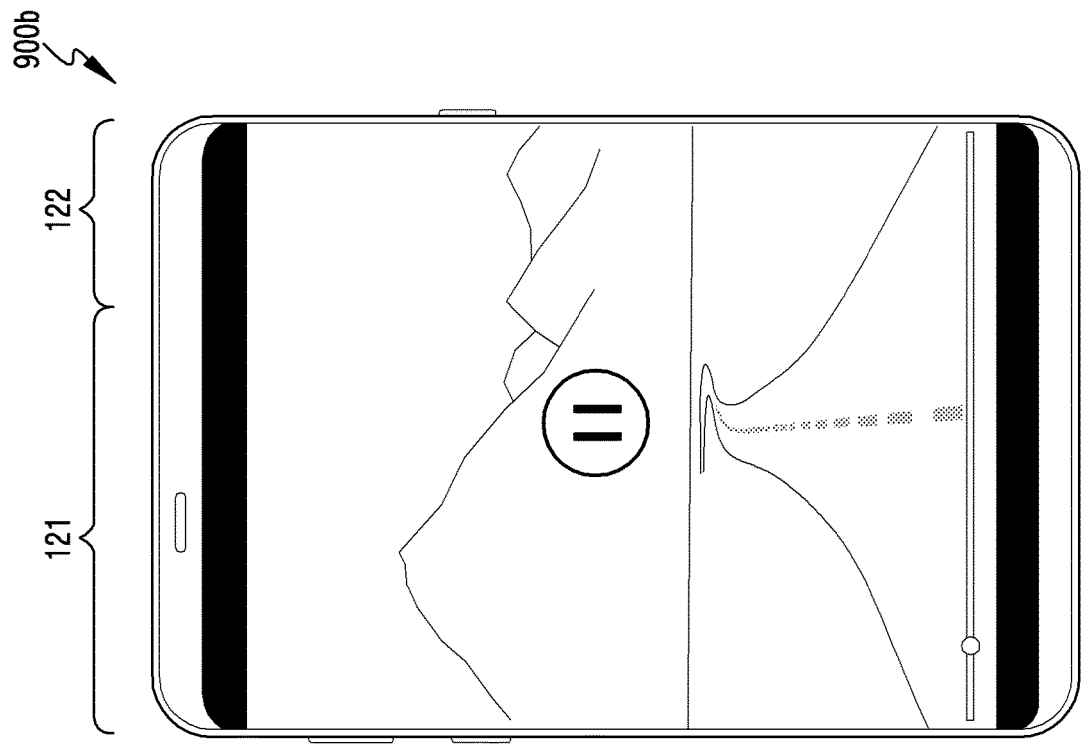
FIG. 9 is a diagram illustrating that the brightness of a screen is changed according to the extension of a display of an electronic device according to an embodiment.
Figure 9:
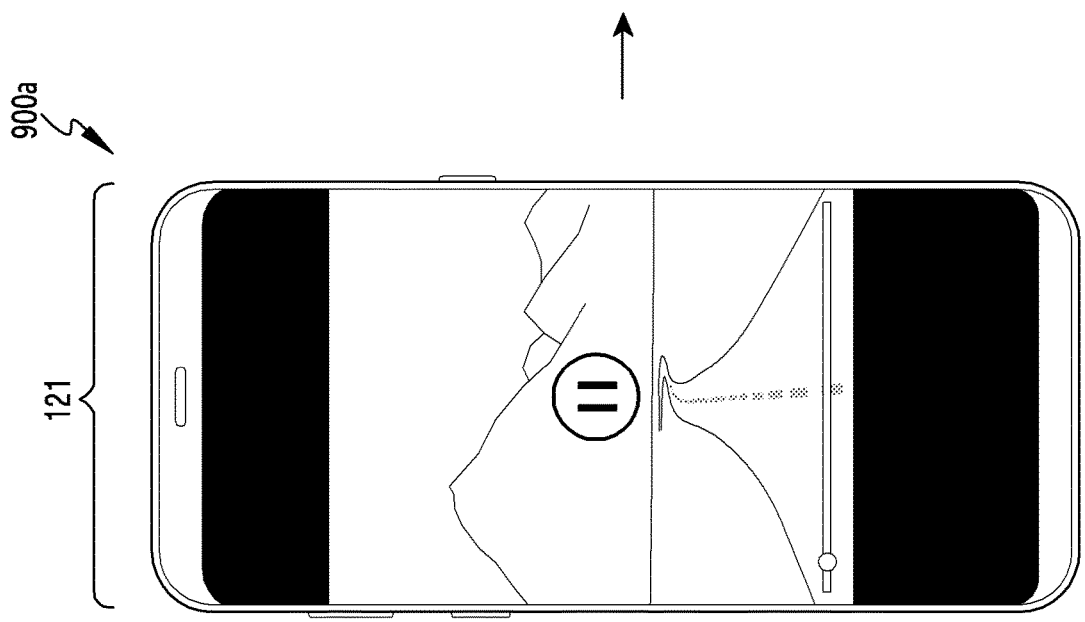

FIG. 9 is a diagram illustrating that the brightness of a screen is changed according to the extension of a display of an electronic device according to an embodiment.

Referring to FIG. 9, the processor 410 of an embodiment can control an externally exposed display to an activated state, based on an overlapped region of the first conductive region 201a and the second conductive region 201b. According to an embodiment, when the electronic device 100 is in a first state 900a, the processor 410 can control the first part 121 to the activated state and control the second part 122 to an inactivated state. According to an embodiment, the processor 410 can control the first part 121 and the second part 122 to the activated state as the electronic device 100 is switched from the first state 900a to a second state 900b (e.g., an extended state).

According to an embodiment, in the second state 900b in which the display 120 is extended, the electronic device 100 can automatically apply, to the first part 121 and the second part 122, a screen brightness (e.g., a second brightness) different from a screen brightness (e.g., a first brightness) applied to the first part 121 in the first state 900a.

Figure 10:
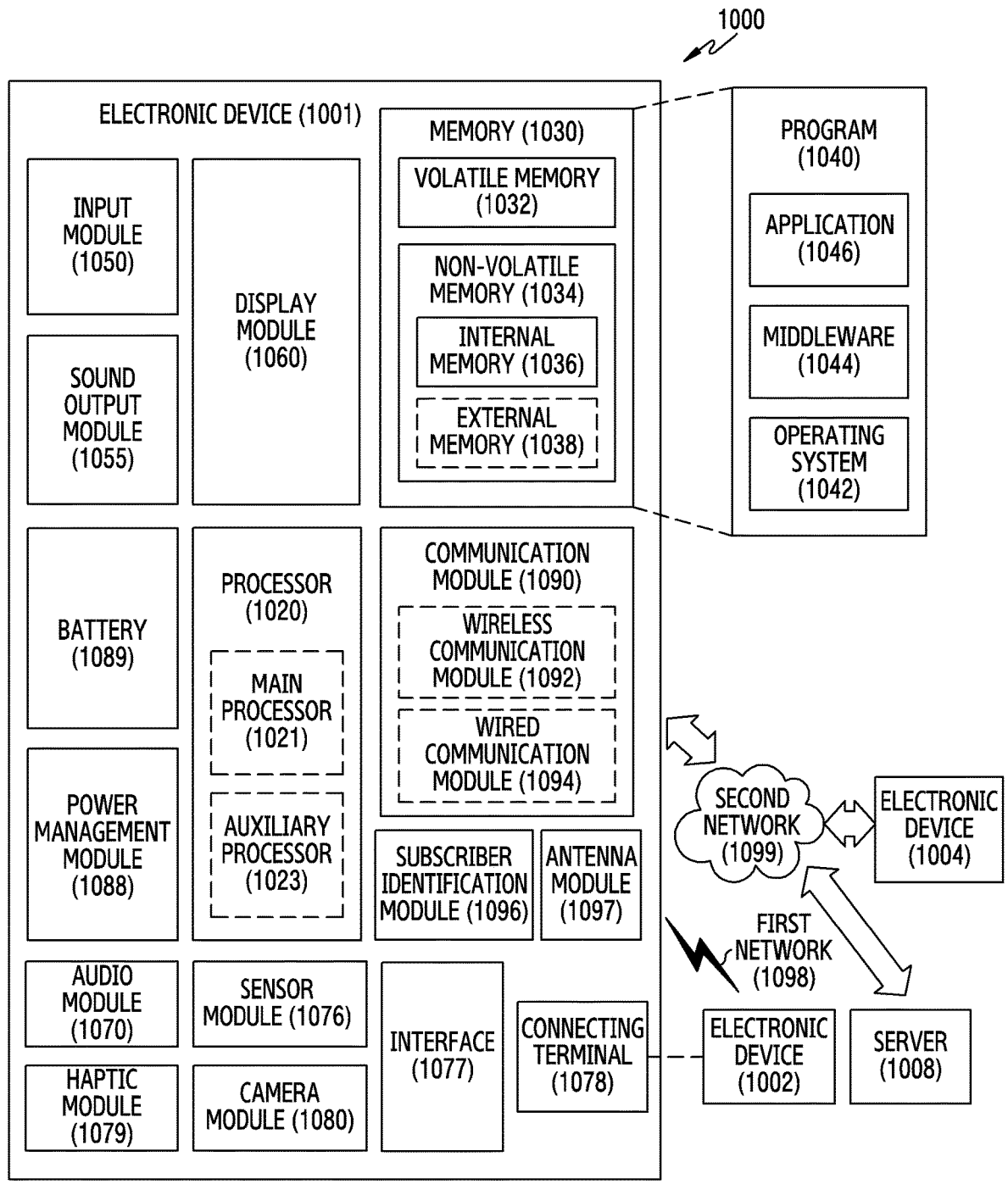
FIG. 10 is a block diagram of an electronic device within a network environment according to an embodiment.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 100 of FIG. 1A and FIG. 1B) of an embodiment can include a first housing (e.g., the first housing 111 of FIG. 1A and FIG. 1B), a second housing (e.g., the second housing 112 of FIG. 1A and FIG. 1B) at least partially overlapping with the first housing and being movable, a first conductive region (e.g., the first conductive region 201a of FIG. 2 and FIG. 3) formed or disposed inside the first housing, a second conductive region (e.g., the second conductive region 201b of FIG. 2 and FIG. 3) formed or disposed inside the second housing to at least partially overlap with the first conductive region when the second housing moves with respect to the first housing, a display (e.g., the display 120 of FIG. 1A and FIG. 1B) in which at least a first region is exposed to the outside of the electronic device through a front surface of the electronic device, and a second region extending from the first region of the display is withdrawn from the inside of the first housing and exposed to the outside of the electronic device together with the first region when the electronic device is switched from a first state to a second state, and is introduced into the inside of the first housing when the electronic device is switched from the second state to the first state, and at least one processor operatively connected to the display. The at least one processor is configured to identify a capacitance value, based on an overlapped region of the first conductive region and the second conductive region, determine an externally exposed region of the display, on the basis of the identified capacitance value, and control the region determined to be exposed outside, to an activated state, and control the remaining region except the region determined to be exposed outside, to an inactivated state.

According to an embodiment, at least one of the first conductive region and the second conductive region can be formed of a copper (Cu) material.

According to an embodiment, the first conductive region or the second conductive region can be electrically connected to the ground (GND).

According to an embodiment, the first housing and the second housing can be a bracket, and the first conductive region and the second conductive region can correspond to a conductive material formed on a surface of the bracket.

According to an embodiment, an area size of the first conductive region and the second conductive region can be 3 cm×3 cm or more.

According to an embodiment, the electronic device can include at least one sensor, and the at least one processor may determine the movement of the second housing by using the at least one sensor.

According to an embodiment, the at least one sensor can include at least one of a touch sensor, a time of flight (ToF) sensor, a proximity sensor, an inertial sensor, or a hall sensor.

According to an embodiment, the at least one processor can control the display to display a plurality of execution screens of each of a plurality of applications in a region determined to be exposed outside.

According to an embodiment, the at least one processor can dynamically change a scan rate of the display, based on a size of the region determined to be exposed outside, while the electronic device is switched from the first state to the second state.

According to an embodiment, the at least one processor can change a location of a UI in response to the electronic device completing the switching from the first state to the second state.

According to an embodiment, the at least one processor can change a size of an execution screen on which contents are displayed, at a specified rate, based on the size of the region determined to be exposed outside, while the electronic device is switched from the first state to the second state.

According to an embodiment, the at least one processor can change a screen brightness setting, based on the size of the region determined to be exposed outside, while the electronic device is switched from the first state to the second state.

As described above, a method of operating an electronic device (e.g., the electronic device 101 of FIG. 1A and FIG. 1B) having a flexible display of an embodiment can include identifying, by a processor of the electronic device, a capacitance value, based on an overlapping region of a first conductive region formed or disposed inside a first housing of the electronic device and a second conductive region formed or disposed inside a second housing of the electronic device, determining, by the processor, an externally exposed region among the flexible display, based on the identified capacitance value, and controlling, by the processor, the region determined to be exposed outside, to an activated state, and controlling the remaining region except the region determined to be exposed outside, to an inactivated state.

The operating method of the electronic device of an embodiment can further include determining an externally exposed region of the display by using at least one sensor.

In the operating method of the electronic device of an embodiment, the at least one sensor can include at least one of a touch sensor, a ToF sensor, a proximity sensor, an inertial sensor, or a Hall sensor.

The operating method of the electronic device of an embodiment can further include controlling the display to display a plurality of execution screens of each of a plurality of applications in the region determined to be exposed outside.

The operating method of the electronic device of an embodiment can include dynamically changing a scan rate of the display, based on a size of the region determined to be exposed outside, while the electronic device is switched from a first state to a second state.

The operating method of the electronic device of an embodiment can further include changing a location of a UI in response to the electronic device completing the switching from the first state to the second state.

The operating method of the electronic device of an embodiment can further include changing a size of an execution screen on which contents are displayed, at a specified rate, based on the size of the region determined to be exposed outside, while the electronic device is switched from the first state to the second state.

The operating method of the electronic device of an embodiment can further include changing a screen brightness setting, based on a size of a region determined to be exposed outside, while the electronic device is switched from a first state to a second state.

The invention claimed is:

1. An electronic device comprising:
a first housing;
a second housing at least partially overlapping with the first housing and being movable;
a first conductive region formed or disposed inside the first housing;
a second conductive region formed or disposed inside the second housing to at least partially overlap with the first conductive region when the second housing moves with respect to the first housing;
a display in which at least a first region is exposed to the outside of the electronic device through a front surface of the electronic device, and a second region extending from the first region of the display is withdrawn from the inside of the first housing and exposed to the outside of the electronic device together with the first region when the electronic device is switched from a first state to a second state, and is introduced into the inside of the first housing when the electronic device is switched from the second state to the first state; and
at least one processor operatively connected to the display,
wherein the at least one processor is configured to:
identify a capacitance value, based on an overlapped region of the first conductive region and the second conductive region,
determine an externally exposed region of the display, on the basis of the identified capacitance value, and
control the region determined to be exposed outside, to an activated state, and controls the remaining region except the region determined to be exposed outside, to an inactivated state.

2. The electronic device of claim 1, wherein at least one of the first conductive region and the second conductive region is formed of a copper (Cu) material.

3. The electronic device of claim 1, wherein the first conductive region or the second conductive region is electrically connected to the ground (GND).

4. The electronic device of claim 1, wherein the first housing and the second housing are brackets, and the first conductive region and the second conductive region correspond to conductive materials formed on a surface of the bracket.

5. The electronic device of claim 1, wherein an area size of the first conductive region and the second conductive region is 3 cm×3 cm or more.

6. The electronic device of claim 1, comprising at least one sensor,
wherein the at least one processor determines the movement of the second housing by using the at least one sensor.

7. The electronic device of claim 6, wherein the at least one sensor comprises at least one of a touch sensor, a time of flight (ToF) sensor, a proximity sensor, an inertial sensor, and a hall sensor.

8. The electronic device of claim 1, wherein the at least one processor controls the display to display a plurality of execution screens of each of a plurality of applications, in the region determined to be exposed outside.

9. The electronic device of claim 1, wherein the at least one processor dynamically changes a scan rate of the display on the basis of a size of the region determined to be exposed outside, while the electronic device is switched from the first state to the second state.

10. The electronic device of claim 1, wherein the at least one processor changes a location of a UI in response to that the electronic device completes the switching from the first state to the second state.

11. The electronic device of claim 1, wherein the at least one processor changes, at a specified rate, a size of an execution screen on which contents are displayed, based on the size of the region determined to be exposed outside, while the electronic device is switched from the first state to the second state.

12. The electronic device of claim 1, wherein the at least one processor changes s screen brightness setting, based on a size of the region determined to be exposed outside, while the electronic device is switched from the first state to the second state.

13. A method of operating an electronic device having a flexible display, the method comprising:
identifying, by a processor of the electronic device, a capacitance value, based on an overlapping region of a first conductive region formed or disposed inside a first housing of the electronic device and a second conductive region formed or disposed inside a second housing of the electronic device;
determining, by the processor, an externally exposed region among the flexible display, based on the identified capacitance value; and
controlling, by the processor, the region determined to be exposed outside, to an activated state, and controlling the remaining region except the region determined to be exposed outside, to an inactivated state.

14. The operating method of the electronic device of claim 13, further comprising determining the externally exposed region of the flexible display using at least one sensor.

15. The operating method of the electronic device of claim 14, wherein the at least one sensor comprises at least one of a touch sensor, a ToF sensor, a proximity sensor, an inertial sensor, or a Hall sensor.

16. The operating method of the electronic device of claim 13, further comprising controlling the display to display a plurality of execution screens of each of a plurality of applications in the region determined to be exposed outside.

17. The operating method of the electronic device of claim 13, further comprising dynamically changing a scan rate of the display, based on a size of the region determined to be exposed outside, while the electronic device is switched from a first state to a second state.

18. The operating method of the electronic device of claim 13, further comprising changing, by the electronic device, a location of a UI in response to completion of the switching from the first state to the second state.

19. The operating method of the electronic device of claim 13, further comprising, while the electronic device is switched from the first state to the second state, changing a size of an execution screen on which contents are displayed, at a specified rate, based on the size of the region determined to be exposed outside.

20. The operating method of the electronic device of claim 13, further comprising, while the electronic device is switched from the first state to the second state, changing a screen brightness setting on the basis of the size of the region determined to be exposed outside.

\* \* \* \* \*